(12) United States Patent
Choi

(10) Patent No.: US 11,496,403 B2
(45) Date of Patent: Nov. 8, 2022

(54) MODIFYING THE CONGESTION CONTROL ALGORITHM APPLIED TO A CONNECTION BASED ON REQUEST CHARACTERISTICS

(71) Applicant: CLOUDFLARE, INC., San Francisco, CA (US)

(72) Inventor: Jun Ho Choi, Sunnyvale, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/798,892

(22) Filed: Feb. 24, 2020

(65) Prior Publication Data

US 2021/0266265 A1 Aug. 26, 2021

(51) Int. Cl.
*H04L 47/27* (2022.01)
*H04L 47/193* (2022.01)
*H04L 47/283* (2022.01)
*H04L 47/10* (2022.01)

(52) U.S. Cl.
CPC ............ *H04L 47/27* (2013.01); *H04L 47/193* (2013.01); *H04L 47/283* (2013.01); *H04L 47/37* (2013.01)

(58) Field of Classification Search
CPC ....... H04L 47/27; H04L 47/37; H04L 47/193; H04L 47/283; H04L 47/11
See application file for complete search history.

(56) References Cited

U.S. PATENT DOCUMENTS

| | | | | |
|---|---|---|---|---|
| 2007/0008883 | A1* | 1/2007 | Kobayashi | H04L 47/10 370/230 |
| 2015/0280959 | A1* | 10/2015 | Vincent | G06F 3/0622 709/203 |
| 2018/0123959 | A1* | 5/2018 | Maslak | H04L 47/125 |
| 2019/0222520 | A1* | 7/2019 | Kandasamy | H04L 43/0852 |

\* cited by examiner

*Primary Examiner* — Soe Hlaing
(74) *Attorney, Agent, or Firm* — Nicholson De Vos Webster & Elliott LLP

(57) ABSTRACT

An edge server receives a first request message for transmission to the host device. The edge server determines a first congestion control algorithm based on the first request message, including characteristics of the first request message. The edge server applies the first congestion control algorithm to the transport connection for application to the transmission of the first request message. Subsequently, the edge server receives a second request message for transmission to the host device over the transport connection. Based on the second request message, including characteristics of the second request message, the edge server determines and applies a second congestion control algorithm to the transport connection for application to the transmission of the second request message, wherein the second congestion control algorithm is different from the first congestion control algorithm

18 Claims, 5 Drawing Sheets

MODIFYING THE CONGESTION CONTROL ALGORITHM APPLIED TO A CONNECTION BASED ON REQUEST CHARACTERISTICS

FIELD

Embodiments of the invention relate to the field of network communications, and more specifically, to modifying the congestion control algorithm applied to a connection based on request characteristics.

BACKGROUND

Internet hosts are concerned with maintaining high security, performance, and reliability of their hosted resources, such as websites. As the popularity of a resource increases, so does the amount of network traffic that is directed to the resource. Excessive or unmanaged network traffic can result in network congestion, and ultimately, dropped network traffic, affecting the security, performance and reliability of a resource. One tool for mitigating the negative effects of excessive or unmanaged network traffic is to apply congestion control algorithms. Congestion control algorithms can use various techniques to regulate network traffic to prevent network congestion, including a slow start strategy and modifications to TCP congestion windows. A slow start strategy starts by sending a small amount of data and slowly increases the amount of data transmitted until it reaches a certain point (e.g., a slow start threshold, the network's maximum carrying capacity, or another value). The congestion window indicates the maximum amount of data that can be sent out on a connection without being acknowledged. An example congestion control algorithm can decrease the congestion window when an acknowledgement for a packet is not received within an estimated or expected timeout period.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
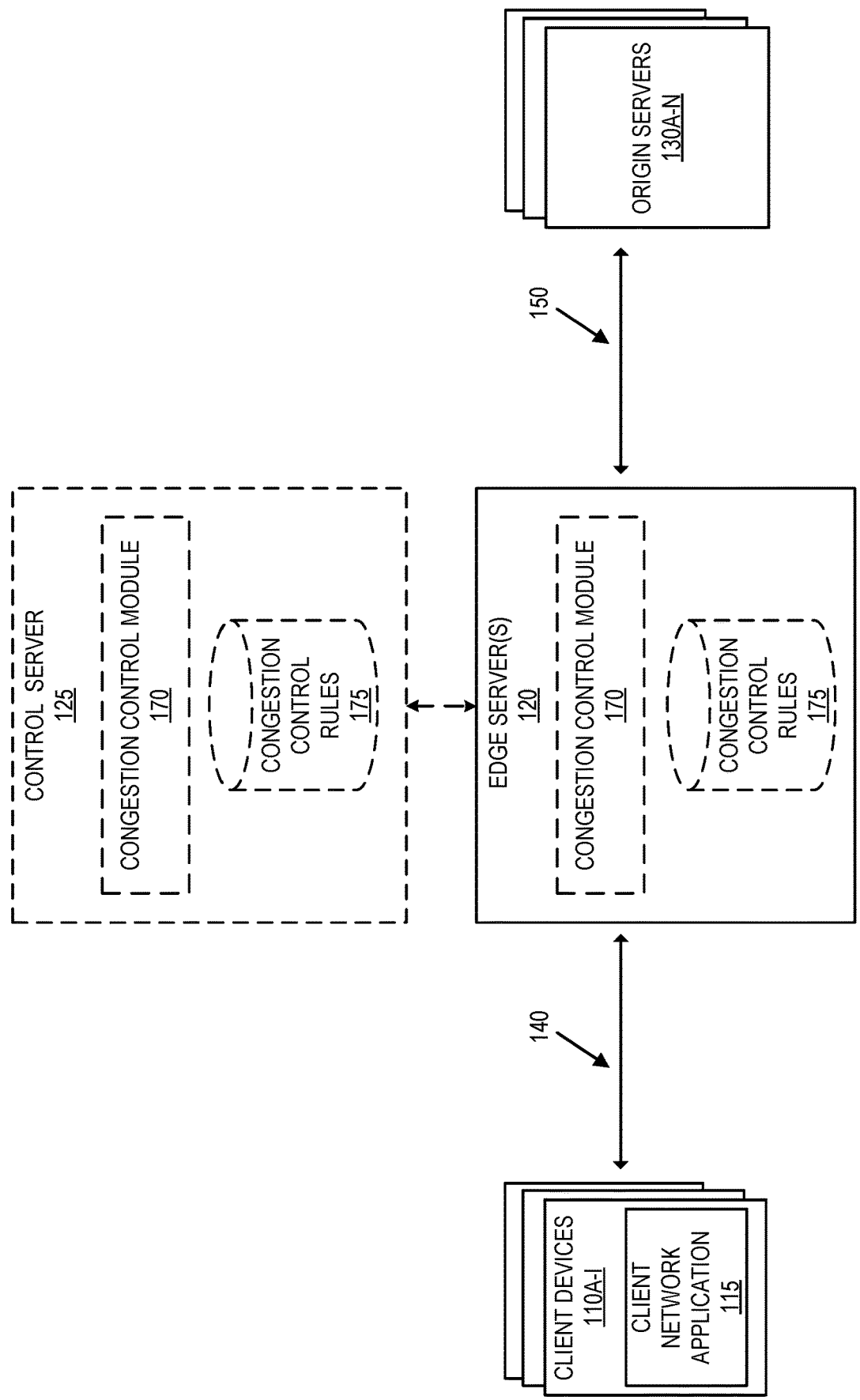
FIG. 1 illustrates an exemplary networked system according to some embodiments described herein.

Transfer rates of network traffic between devices are limited by the physical channels upon which the network traffic travel, such as ethernet cables and cellular links, and often by the number of devices connected. Network congestion can occur when network traffic is so heavy (e.g., greater than the physical channels can handle) that it clogs up the physical channels and slows down response times, resulting in delays and/or dropped packets. To reduce or limit the amount of congestion of network traffic on a connection, congestion control algorithms can be applied with the objective of allowing an amount of network traffic below a congestion level.

In conventional solutions, when a client (e.g., a browser or other network application such as a mobile application using an HTTP library) creates a new HTTP/S connection, a congestion control algorithm is determined prior to the client sending a request. In the case of TCP, a TCP server initializes a congestion control algorithm when the new TCP connection is accepted (e.g., when accept( ) is returned). Conventionally, the chosen connection control algorithm is fixed for the lifetime of the connection, which may involve multiple requests and responses (e.g., multiple http/s requests). To manage congestion on a connection, TCP can use a congestion window ("cwnd"), which is a value indicating the amount of data (e.g., number of bytes) that can be sent into the network before receiving an acknowledgement. Typically, when a new connection is established, the congestion window is initialized at a small value and increased over time. Congestion is detected either by the receipt of a duplicate acknowledgement or a timeout signal. When this occurs, the send rate can be decreased by decreasing the congestion window size based on the configuration of the chosen congestion control algorithm.

However, a fixed congestion control algorithm for all network traffic on the transport connection can result in inefficiencies in how network traffic is sent over the transport connection. For example, a fixed congestion control algorithm may be ideal for one type of network traffic, but not for other types of network traffic, and a transport connection may be tasked with carrying multiple types of network traffic.

The embodiments described herein provide mechanisms for modifying the congestion control algorithm applied to a connection based on one or more request characteristics. In one embodiment, an edge server that handles network traffic between a client device and host device determines a congestion control algorithm by evaluating request characteristics of a request message. In some embodiments, request characteristics can include the contents of the request itself, including pattern matching a requested pathname, determining content length of the requested content, and an evaluation of other header data, etc., or a characteristics of the source of the request, including whether the request was received via a mobile connection or a Wi-Fi connection. Based on the request characteristics, the edge server can apply a congestion control algorithm. Upon receiving a subsequent request message, the edge server can evaluate the request characteristics of the subsequent request message, and determine that a different congestion control algorithm should be applied to the transport connection.

Embodiments of the invention provide many technical advantages, in addition to addressing the deficiencies of previous solutions. For example, when a transport connection is established that will be tasked with handling multiple types of resources of varying sizes (e.g., a short API request or a large file download), the ability to apply different congestion control algorithm per request type or response type provides greater efficiencies in how network traffic is managed.

FIG. 1 illustrates an exemplary networked system according to some embodiments described herein. The exemplary networked system illustrated in FIG. 1 includes edge server(s) 120 that are situated between client devices 110A-I and origin server(s) 130A-N.

In one embodiment, edge server(s) 120 terminates transport connections between an edge server 120 and client devices 110A-I (e.g., transport connection 140), in addition to establishing transport connections between edge server 120 and origin servers 130A-N (e.g., transport connection 150). The transport connection 140 may be a TCP connection, a QUIC, or other transport layer protocol connection. In some embodiments, origin servers 130A-N host resources or other content that can be requested by client devices 110A-I. In one embodiment, the edge server(s) 120 is configured to receive requests to access and/or modify the resources hosted by the origin servers 130A-N, and further receives responses to such requests with the requested resources from the origin servers 130A-N. For example, web traffic (e.g., HTTP requests/responses, HTTPS requests/responses, HTTP/2 requests/responses, HTTP/3 requests/responses, etc.) for domains handled by origin servers 130A-N may be received via transport connection 140 and processed at edge server(s) 120. In one embodiment, as part of handling requests to access resources, the edge server(s) 120 is further configured to retrieve and/or analyze properties of each request and each response and, based at least on those properties, perform actions on transport connection 140 between client devices 110A-I and edge servers 120.

Examples of client devices 110A-I include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of client devices 110A-I executes client network application 115 that is capable of transmitting and/or receiving network traffic. For example, client network application 115 may be a web browser or other application that can access network resources (e.g., web pages, images, word processing documents, PDF files, movie files, music files, or other computer files).

Examples of origin servers 130A-N include computing devices that may serve and/or generate network resources (e.g., web pages, images, word processing documents, PDF files movie files, music files, or other computer files). Origin servers 130A-N may also be another edge server to the server that serves and/or generates network resources. Although not illustrated in FIG. 1, it should be understood that the network resources of origin servers 130A-N may be stored separately from the device that responds to the requests. One or more of origin servers 130A-N may handle multiple domains that resolve to edge server(s) 120.

The service may also include control server 125, which may be owned or operated by the service. In some embodiments, control server 125 may receive a command from edge server(s) 120 to determine and apply the appropriate congestion control rules described herein.

In one embodiment, edge server(s) 120, or optionally control server 125, includes congestion control module 170 and congestion control rules storage 175. Congestion control module 170 is configured to analyze request messages from client devices 110A-I and response messages from origin servers 130A-N. Congestion control module 170 is further configured to access congestion control rules stored in congestion control rules storage 175 and apply one of a plurality of congestion control algorithms to connections between client devices 110A-I and edge servers 120. For example, an edge server 120 can accept transport connection 140 from a client device (e.g., client device 110A) to edge server 120.

In one embodiment, congestion control rules storage 175 stores a plurality of congestion control rules that can be used by congestion control module 170 to determine the appropriate congestion control algorithm to apply to transport connection 140. In some embodiments, congestion control rules storage 175 includes profiles or data structures, where the profiles or data structures store information indicating congestion control rules associated with a particular origin server, a particular resource type, a resource size range, etc.

In some embodiments, congestion control rules in congestion control rules storage 175 are based on pattern matching to content in a request message or response message. For example, congestion control module 170 can select a congestion control algorithm based on the content of a pathname (e.g., URL) or a header of a request/response message. For a pathname, the congestion control rules can be based on pattern matching a word, a number, or a regex in a request message. For example, a pathname with the word "download" may result in a congestion control algorithm being applied that is better suited for large files, while a pathname with the word "image" or "txt" may result in a congestion control algorithm being applied that is better suited for smaller files. For a header, the congestion control rules can be based on identifying a value of a content-length header in a header portion of a response message, where a first congestion control algorithm is applied when the value is below a threshold and a second congestion control algorithm is applied when the value is above the threshold, or vice versa.

Figure 2:
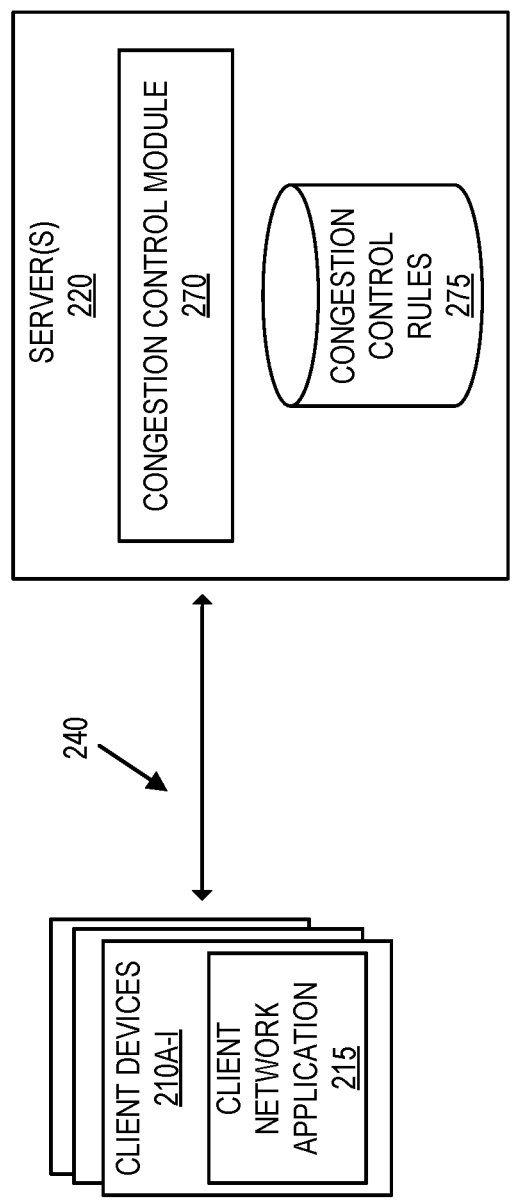
FIG. 2 illustrates an exemplary networked system according to some embodiments described herein.

FIG. 2 illustrates an exemplary networked system according to some embodiments described herein. The exemplary networked system illustrated in FIG. 2 includes client devices 210A-I communicating with server(s) 220 via transport connection 240, where server(s) 220 host resources or other content that can be requested by client devices 210A-I (e.g., by client network application 215 operating on client devices 210A-I).

Examples of client devices 210A-I include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of client devices 210A-I executes client network application 215 that is capable of transmitting and/or receiving network traffic. For example, client network application 215 may be a web browser or other application that can access network resources.

In one embodiment, server(s) 220, similar to origin servers 130A-N in FIG. 1, can include computing devices that may serve and/or generate network resources (e.g., web pages, images, word processing documents, PDF files movie files, music files, or other computer files). Server(s) 220 further includes congestion control module 270 and congestion control rules storage 275, which are similar to congestion control module 170 and congestion control rules storage 175, respectively, as described above with respect to FIG. 1.

In some embodiments, because congestion control module 270 is located on the same server (e.g., server(s) 220) as the resources that are requested in a request message from client devices 210A-I, congestion control module 270 can have more insight into the details of the requested resource. For example, congestion control module 270 can identify the size of the requested resource without parsing through a header portion of a response message to locate a value of a content-length header.

Figure 3:
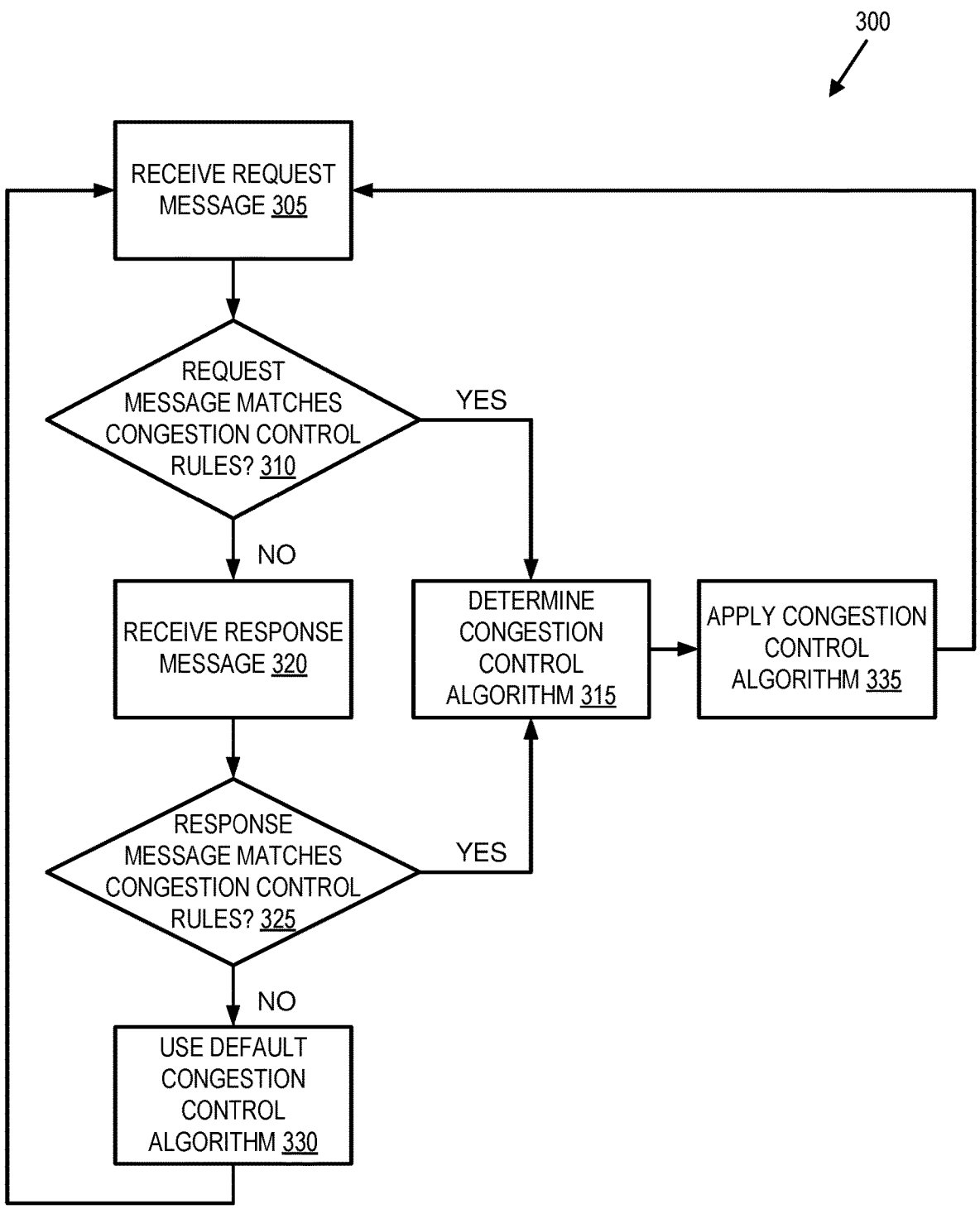
FIG. 3 is a flow diagram that illustrates exemplary operations for dynamically selecting a congestion control algorithm based on one or more request characteristics according to an embodiment.

FIG. 3 is a flow diagram 300 that illustrates exemplary operations for dynamically selecting a congestion control algorithm based on one or more request characteristics according to an embodiment. The operations of FIG. 3 will be described with reference to the exemplary embodiment of FIG. 1. However, it should be understood that the operations of FIG. 3 can be performed by embodiments of the invention other than those discussed with reference to FIG. 1, and the embodiments discussed with reference to FIG. 1 can perform operations different than those discussed with reference to FIG. 3. For instance, the embodiments described in FIG. 3 can be performed by embodiments with reference to FIG. 2. The operations of FIG. 3 are described as being performed by one or more edge servers (e.g., edge server(s) 120). In some embodiments, the operations are performed by congestion control module 170 operating on edge server(s) 120.

In operation 305, an edge server (e.g., edge server 120) receives a request message from a client device (e.g., client device 110A) directed to an origin server (e.g., origin server 130A). Prior to receiving the request message, a connection (e.g., transport connection 140) is established between client device 110A and edge server 120. For example, an edge server 120 can accept transport connection 140 initiated by a client device (e.g., client device 110A) to edge server 120. In some embodiments, edge server 120 selects a default or initial control congestion algorithm when the transport connection is established. Edge server 120 utilizes transport connection 140 to handle request messages from client device 110A and response messages directed to client device 110A (e.g., HTTP/S request/responses). In the embodiment of FIG. 2, the server 220 receives a request message from a client device 210A-I over a transport connection 240.

In operation 310, edge server 120 determines whether one or more characteristics of the request message match one or more congestion control rules. In some embodiments, request message characteristics can include the contents of the request itself, including pattern matching a requested pathname, determining content length of the requested content, and an evaluation of other header data, etc., or a characteristics of the source of the request, including whether the request was received via a mobile connection or a Wi-Fi connection.

In one embodiment, edge server 120 determines whether one or more characteristics of the request message match one or more congestion control rules by performing a pattern matching process to match a specific word or phrase in the request (e.g., within a pathname in an HTTP request header) with the elements of one or more congestion control rules.

In some cases, when a resource requested in the request message and/or the content-length header of the corresponding response is cached at edge server 120, edge server 120 can determine the size of the response message. In another embodiment, edge server 120 identifies a value of the content-length header of the response to the request that indicates a size of the body of the response. In some embodiments, edge server 120 uses other information in the response header to determine which congestion control algorithm to use. For example, the information stored in a "content-type" field can be used to select a congestion control algorithm. In some embodiments, edge server 120 determines characteristics of the source of the request message to determine a congestion control algorithm. For example, edge server 120 can select different congestion control algorithms based on whether the request message was received via a mobile connection or a Wi-Fi connection, e.g., by identifying the information stored in the source IP fields, a user-agent value, or another field in a request header that identifies client network information.

When the request message matches one or more of the congestion control rules, the flow proceeds to operation 315.

In operation 315, when at least one characteristic of the request message matches one or more congestion control rules, edge server 120 determines a particular congestion control algorithm based, at least in part, on the characteristics of the request message. For example, a congestion control rule can apply a first congestion control algorithm when the pathname includes the word "download," and a second congestion control algorithm otherwise. In some cases, a congestion control rule can apply a specific congestion control algorithm for all network traffic associated with a particular domain. In some cases, edge server 120 identifies a value of the content-length header of the response message that indicates a size of the body of the response message. In some cases, where the resource requested in the request message and/or the size of the resource is known (e.g., cached) at edge server 120, edge server 120 can determine the size of the response message prior to generating the response message. After the appropriate congestion control algorithm has been determined, the flow proceeds to operation 335.

When the request message does not match one or more of the congestion control rules, the flow proceeds to operation 320. At this point, edge server 120 processes the request in the request message (e.g., by forwarding the request to origin server 130A or retrieving resources cached at edge server 120 on behalf of origin server 130A). Further, in some embodiments, where the request message does not match one or more of the congestion control rules, edge server 120 can apply a default congestion control algorithm or no congestion control algorithm.

In operation 320, edge server 120 receives a response message, e.g., from the one or more of origin servers 130A-N directed to the requesting client device from operation 305. In one embodiment, edge server 120 receives the response message via transport connection 150 established between origin servers 130A-N and edge server 120. In some embodiments, the response message is generated by edge server 120 on behalf of origin server 130A, for example, if the requested resource is stored in a cache or memory of edge server 120.

In operation 325, edge server 120 determines whether characteristics of the response message match one or more congestion control rules, triggering the application of one of a plurality of congestion control algorithms. For example, edge server 120 can perform a pattern matching as described above with respect to operation 310. For example, when edge server 120 receives the response message from the one or more of origin servers 130A-N directed to the requesting client device, edge server 120 can analyze the response message to determine the size of the response message (e.g., from the content-length header of the response message).

When the response message matches one or more of the congestion control rules, the flow proceeds to operation 315, and performs the actions described above. For example, edge 120 can identify a value of the content-length header of the response message that indicates a size of the body of the response message. In some embodiments, edge server 120 can determine a first congestion control algorithm to apply when the value of the content-length header of the response message is below a threshold and a second congestion control algorithm to apply when the value of the content-length header of the response message is above the threshold.

When the response message does not match one or more of the congestion control rules, the flow proceeds to operation 330. In operation 330, edge server 120 can apply a default congestion control algorithm or, alternatively, no congestion control algorithm to transport connection 140.

After applying the default congestion control algorithm, edge server 120 initiates sending the response message to client device 110A via transport connection 140 and the flow proceeds back to operation 305 where edge server 120 receives a subsequent request message.

In operation 335, edge server 120 applies the determined congestion control algorithm to transport connection 140. If the determined congestion control algorithm is the same congestion control algorithm that is applied to the transport connection 140, then the congestion control algorithm is not changed. In some embodiments, applying the determined congestion control algorithm further includes first determining whether transport connection 140 is idle. In some embodiments, a connection is idle when the sender has no in-flight data requiring an ACK from the receiver. In some cases, edge server 120 applies the determined congestion control algorithm only if transport connection 140 is idle. For example, if HTTP/2 or HTTP/3 is being used, the determined congestion control algorithm may be applied responsive to determining that transport connection 140 is idle. If HTTP 1.1 is used, the determined congestion control algorithm may be applied prior to sending the response message when the connection is idle. However, in some embodiments, even when the connection is not idle, there are states that permit changing the congestion control algorithm on a transport connection. For example, if transport connection 140 is currently using a Cubic congestion control algorithm, the congestion control algorithm can be changed to a Reno congestion control algorithm, even when not idle.

After applying the determined congestion control algorithm, edge server 120 initiates sending the response message to client device 110A via transport connection 140 and the flow proceeds back to operation 305 where edge server 120 receives a subsequent request message.

Figure 4:
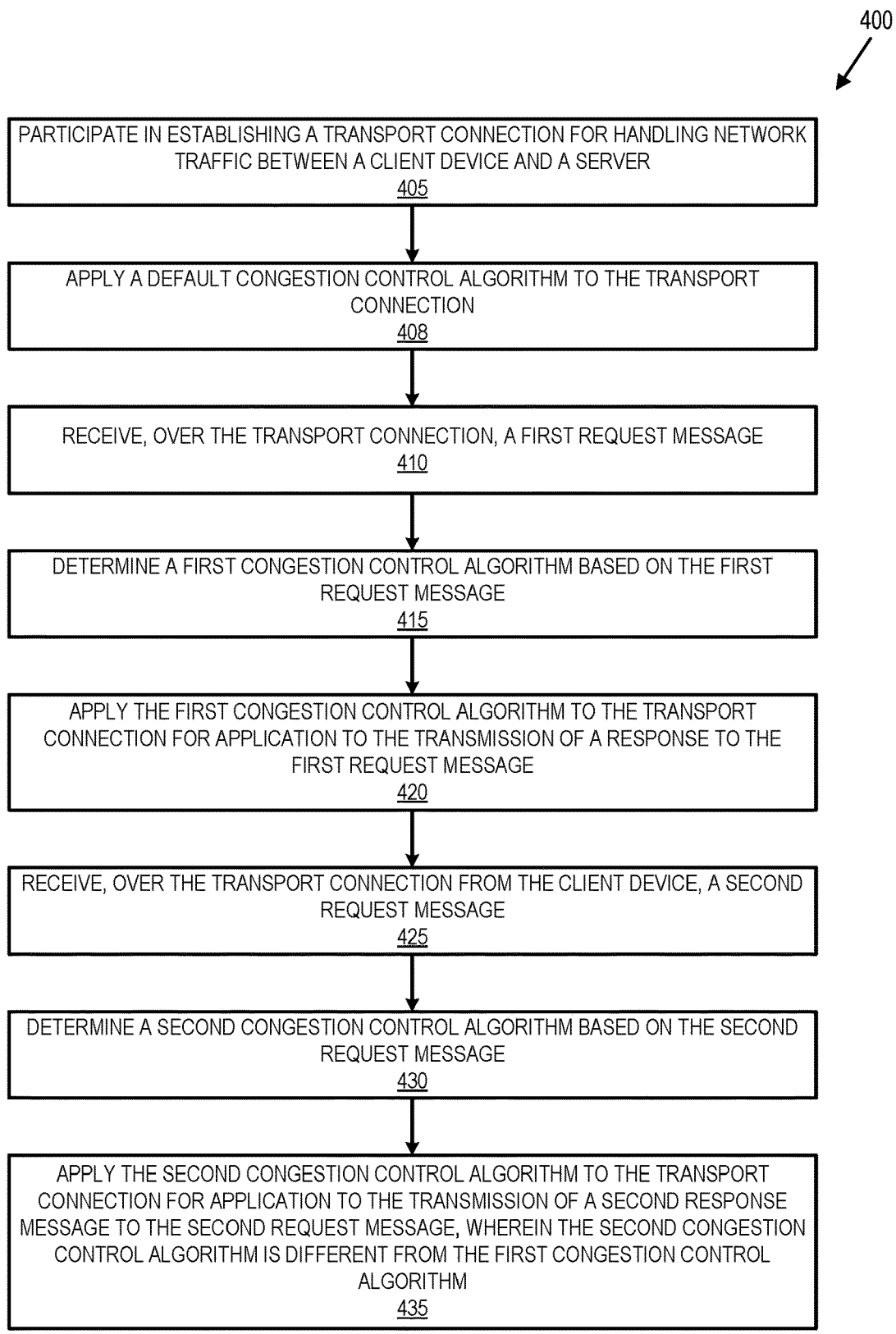
FIG. 4 is a flow diagram that illustrates exemplary operations for applying congestion control algorithms per request on a transport connection according to an embodiment.

FIG. 4 is a flow diagram 400 that illustrates exemplary operations for applying congestion control algorithms per request on a transport connection according to an embodiment. The operations of FIG. 4 will be described with reference to the exemplary embodiment of FIG. 1. However, it should be understood that the operations of FIG. 4 can be performed by embodiments of the invention other than those discussed with reference to FIG. 1, and the embodiments discussed with reference to FIG. 1 can perform operations different than those discussed with reference to FIG. 4. The operations of FIG. 4 are described as being performed by one or more edge servers (e.g., edge server(s) 120). In some embodiments, the operations are performed by congestion control module 170 operating on edge server(s) 120.

In operation 405, the edge server (e.g., edge server(s) 120) participates in establishing a transport connection (e.g., transport connection 140) for handling network traffic between a client device (e.g., client device 110A) and edge server 120. Transport connection 140 can be established by client device 110A. Edge server 120 can also participate in establishing a transport connection (e.g., transport connection 150) for handling network traffic between a host device (e.g., origin server 130A) and edge server 120. In one embodiment, edge server 120 receives HTTP (or similar) requests and sends HTTP (or similar) responses via transport connection 140. In one embodiment, transport connection 140 is established with the client device to receive request messages from client device 110A on behalf of, and directed to, origin server 130A. In some embodiments, the request messages request to access or modify resources hosted by origin server 130A. In some embodiments, edge server 120 can either send the request message to origin server 130A, for example, via transport connection 150, or edge server 120 can retrieve the requested resources stored in a memory at edge server 120. In embodiments where edge server 120 sends the request message to origin server 130A, edge server 120 subsequently receives a response message from origin server 130A via transport connection 150, where the response messages include the requested resources from origin server 130A, and send the requested resources to the requesting client device 110A via transport connection 140.

In operation 408, in some embodiments, when transport connection 140 is first established, edge server 120 applies a default congestion control algorithm that is to be applied on subsequent network traffic sent on transport connection 140.

In operation 410, edge server 120 receives a first request message, over the transport connection. The first request message may be an HTTP/S request. For example, edge server 120 receives an HTTP "GET" request to access a resource hosted by origin server 130A via transport connection 140. In one embodiment, the requested resource is an HTML page located at, e.g., www.example.com/index.html. The request message may include a request for an action to be performed on the resource. In one embodiment, edge server 120 receives the request message because of a DNS for the hostname resolving to an IP address assigned to edge server 120 instead of resolving to an IP address of the origin server hosting the resource.

In operation 415, edge server 120 determines a first congestion control algorithm based on the first request message. Edge server 120 determines which one of multiple congestion control algorithms to use as the first congestion control algorithm based on one or more characteristics of the first request message and/or one or more characteristics derived from the processing of the first request message. The characteristic(s) of the first request message may be included within the first request message (e.g., request URI) and/or derived from the first request message (e.g., network type). The characteristic(s) of the processing of the first request message may include analyzing the response header (e.g., the content-length header of a response message sent in response to the first request message). In some embodiments, edge server 120 determines whether the characteristics of the first request message matches one or more congestion control rules stored by edge server 120.

In one embodiment, edge server 120 parses a pathname of the first request message. In such embodiments, edge server 120 can recognize words, number, and/or regular expressions (regex) in the pathname that may be indicative of the size of the requested resources/content. For example, a pathname that includes "download.foo.com" may be indicative of a larger resource than a pathname that includes "images.foo.com." In some embodiments, edge server 120 accesses a mapping table that maps words, numbers, and/or regular expressions to specific congestion control algorithms. Based on this determination, edge server 120 can select the appropriate congestion control algorithm to apply to transport connection 140. Examples of congestion control algorithms include, but are not limited to, New Reno, Vegas, BIC, CUBIC, BBR, and Compound TCP.

In another embodiment, where a resource requested in the first request message or a content-length header of the resource is cached by edge server 120, edge server 120 determines the size of a response message that will be sent in response to the first request message. The value of the content-length header of the first request message indicates the length of the request body of the first request message (in number of bytes). In some embodiments, edge server 120 selects the congestion control algorithm based on the value of the content-length header as compared to a threshold value. In other embodiments, edge server 120 selects the congestion control algorithm from a table, or other data structure, that includes a plurality of congestion control algorithms.

In some embodiments, the determined first congestion control algorithm can be different or the same as the default congestion control algorithm. For example, based on the evaluation of the first request message, edge server 120 can determine that the appropriate congestion control algorithm is the default congestion control algorithm. In such a scenario, edge server 120 does not change the congestion control algorithm on the transport connection.

In operation 420, edge server 120 applies the first congestion control algorithm to the transport connection for application to the transmission of a first response message to the first request message. In one embodiment, edge server 120 applies the first congestion control algorithm in place of a default congestion control algorithm.

In one embodiment, edge server 120 applies the first congestion control algorithm based on a connection type of transport connection 140. For example, if HTTP 1.1 is used over transport connection 140, in which messages are serialized, edge server 120 applies the first congestion control algorithm to the next request/response message. If HTTP/2 or HTTP/3 is used over transport connection 140, in which messages are multiplexed, allowing multiple messages to be processed in parallel over a single TCP or QUIC connection, edge server 120 first determines whether transport connection 140 is idle. Transport connection 140 is considered idle when there is no data currently in-flight. When transport connection 140 is idle, edge server 120 applies the first congestion control algorithm. When transport connection 140 is not idle, edge server 120 does not apply the first congestion control algorithm or waits until the connection becomes idle and then applies the first congestion control algorithm.

In operation 425, edge server 120 receives a second request message for transmission to the host device via the transport connection. In one embodiment, subsequent to receiving the first request message, edge server 120 receives the second request message requesting resources hosted by origin server 130A via transport connection 140.

In operation 430, edge server 120 determines a second congestion control algorithm based on the second request message. In some embodiments, edge server 120 determines the second congestion control algorithm in the same manner as edge server 120 determined the first congestion control algorithm, as in operation 415 described above. For example, edge server 120 can determine whether the characteristics of the second request message matches one or more congestion control rules.

In operation 435, edge server 120 applies the second congestion control algorithm to the transport connection for application to the transmission of a second response message to the second request message, where the second congestion control algorithm is different from the first congestion control algorithm. In one embodiment, as described above with respect to operation 420, edge server 120 applies the second congestion control algorithm based on a connection type of transport connection 140. When HTTP 1.1 is used over transport connection 140, edge server 120 applies the second congestion control algorithm in between requests. When HTTP/2 or HTTP/3 is used over transport connection 140, edge server 120 does not change the congestion control algorithm unless transport connection 140 is idle. When transport connection 140 is not idle, edge server 120 sends the second request message using the first congestion control algorithm. In some embodiments, edge server 120 waits until the connection becomes idle and then applies the second congestion control algorithm to transport connection 140.

In some embodiments, when edge server 120 applies a new congestion control algorithm, the new algorithm is started at a new slow start rate. However, in other embodiments, edge server 120 can determine an expected bandwidth for the transport connection based on a history of the transport connection (e.g., from previous connections/request). In such embodiments, edge server 120 can start/initiate the new congestion control algorithm at another state based on the expected bandwidth and round-trip time for the transport connection. For example, edge server 120 can initiate the new congestion control algorithm with different values for congestion control state variables. Examples of congestion control state variables include a congestion window ("cwnd") and a slow start threshold ("ssthresh").

Figure 5:
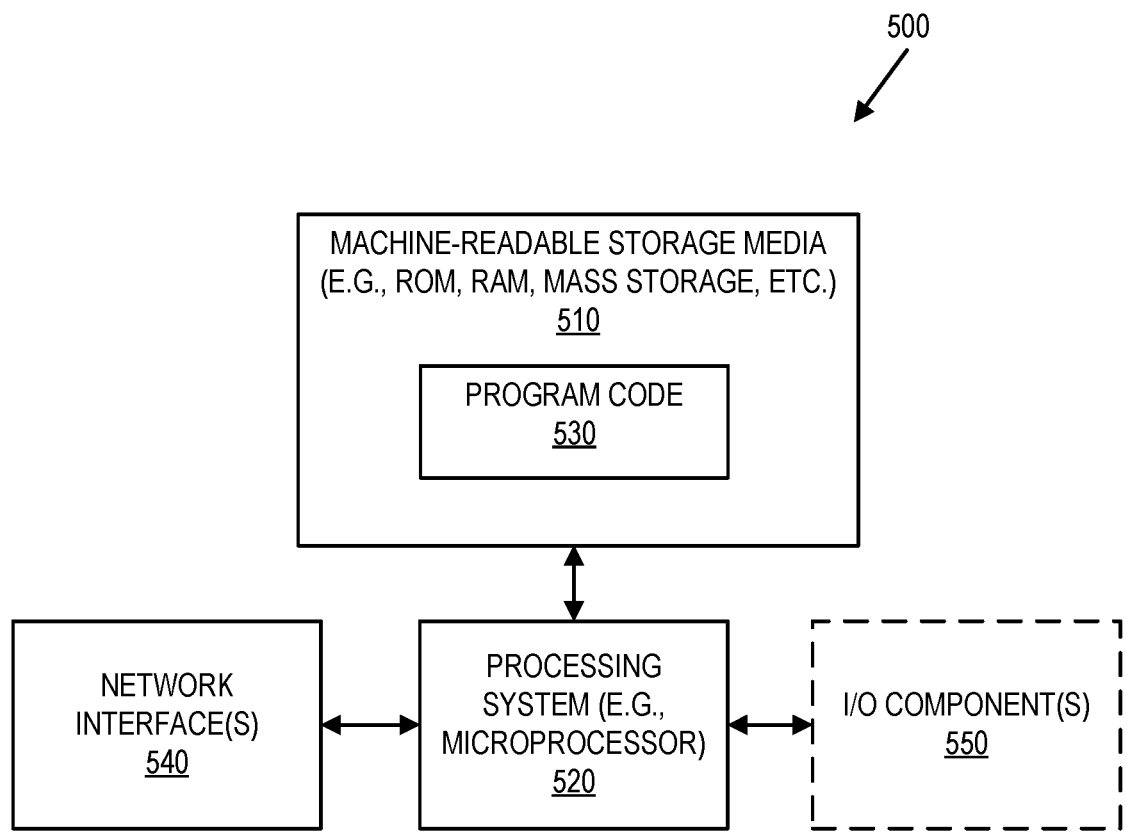
FIG. 5 illustrates a block diagram for an exemplary data processing system 500 that may be used in some embodiments.

FIG. 5 illustrates a block diagram for an exemplary data processing system 500 that may be used in some embodiments. One or more such data processing systems 500 may be utilized to implement the embodiments and operations described with respect to the edge server, origin server, and/or client device.

The data processing system 500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 520. The processing system 520 may be one or more processors and/or connected system components such as multiple connected chips. The depicted machine-readable storage media 510 may store program code 530 that, when executed by the processor(s) 520, causes the data processing system 500 to perform the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 500, and, in certain embodiments, fewer components than that shown may be part of the system 500.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method, comprising:
   receiving, over a transport connection between a client device and a server, a first request message;
   determining characteristics of the first request message, including one or more contents of the first request message, the one or more contents of the first request message including a first header and a first pathname;
   determining a first congestion control algorithm based on the determined characteristics of the first request message, including pattern matching a first keyword of the first pathname with elements of a plurality of congestion control rules;
   applying the first congestion control algorithm to the transport connection for application to a transmission of a first response message to the first request message;
   receiving, over the transport connection from the client device, a second request message;
   determining characteristics of the second request message, including one or more contents of the second request message, the one or more contents of the second request message including a second header and a second pathname;
   determining a second congestion control algorithm based on the determined characteristics of the second request message, including pattern matching a second keyword of the second pathname with the elements of the plurality of congestion control rules; and
   applying the second congestion control algorithm to the transport connection for application to a transmission of a second response message to the second request message, wherein the second congestion control algorithm is different from the first congestion control algorithm.

2. The computer-implemented method of claim 1, further comprising:
   prior to applying the second congestion control algorithm to the transport connection, determining that the transport connection is idle.

3. The computer-implemented method of claim 1, wherein applying the second congestion control algorithm to the transport connection for application to the transmission of the second response message comprises:
   determining an expected bandwidth for the transport connection based on a history of the transport connection; and
   initiating the second congestion control algorithm with a different value for a state variable based on the expected bandwidth and round-trip time for the transport connection.

4. The computer-implemented method of claim 1, wherein determining the first congestion control algorithm based on the characteristics of the first request message comprises:
   identifying that the first pathname in the first request message indicates the first request message is a request for first content having a first size greater than a threshold size; and
   selecting the first congestion control algorithm from a plurality of congestion control algorithms based on the first content having the first size greater than the threshold size.

5. The computer-implemented method of claim 1, wherein determining the second congestion control algorithm based on the characteristics of the second request message comprises:

identifying that the second pathname in the second request message indicates the second request message is a request for second content having a second size less than a threshold size; and selecting the second congestion control algorithm from a plurality of congestion control algorithms based on the second content having the second size less than the threshold size.

6. The computer-implemented method of claim 1, wherein determining the first congestion control algorithm based on the characteristics of the first request message comprises:

parsing the first header of the first request message to determine a first size of first content requested in the first request message; and selecting the first congestion control algorithm from a plurality of congestion control algorithms based on the first content having the first size greater than a threshold size.

7. A non-transitory machine-readable storage medium that provides instructions that, when executed by a processor, cause said processor to perform operations comprising:

receiving, over a transport connection between a client device and a server, a first request message;

determining characteristics of the first request message, including one or more contents of the first request message, the one or more contents of the first request message including a first header and a first pathname;

determining a first congestion control algorithm based on the determined characteristics of the first request message, including pattern matching a first keyword of the first pathname with elements of a plurality of congestion control rules applying the first congestion control algorithm to the transport connection for application to a transmission of a first response message to the first request message;

receiving, over the transport connection from the client device, a second request message;

determining characteristics of the second request message, including one or more contents of the second request message, the one or more contents of the second request message including a second header and a second pathname;

determining a second congestion control algorithm based on the determined characteristics of the second request message, including pattern matching a second keyword of the second pathname with the elements of the plurality of congestion control rules; and applying the second congestion control algorithm to the transport connection for application to a transmission of a second response message to the second request message, wherein the second congestion control algorithm is different from the first congestion control algorithm.

8. The non-transitory machine-readable storage medium of claim 7, wherein the instructions further causes said processor to perform operations comprising:

prior to applying the second congestion control algorithm to the transport connection, determining that the transport connection is idle.

9. The non-transitory machine-readable storage medium of claim 7, wherein applying the second congestion control algorithm to the transport connection for application to the transmission of the second response message comprises:

determining an expected bandwidth for the transport connection based on a history of the transport connection; and initiating the second congestion control algorithm with a different value for a state variable based on the expected bandwidth and round-trip time for the transport connection.

10. The non-transitory machine-readable storage medium of claim 7, wherein determining the first congestion control algorithm based on the characteristics of the first request message comprises:

identifying that the first pathname in the first request message indicates the first request message is a request for first content having a first size greater than a threshold size; and selecting the first congestion control algorithm from a plurality of congestion control algorithms based on the first content having the first size greater than the threshold size.

11. The non-transitory machine-readable storage medium of claim 7, wherein determining the second congestion control algorithm based on the characteristics of the second request message comprises:

identifying that the second pathname in the second request message indicates the second request message is a request for second content having a second size less than a threshold size; and selecting the second congestion control algorithm from a plurality of congestion control algorithms based on the second content having the second size less than the threshold size.

12. The non-transitory machine-readable storage medium of claim 7, wherein determining the first congestion control algorithm based on the characteristics of the first request message comprises:

parsing the first header of the first request message to determine a first size of first content requested in the first request message; and selecting the first congestion control algorithm from a plurality of congestion control algorithms based on the first content having the first size greater than a threshold size.

13. A apparatus, comprising:

a processor;

a non-transitory machine-readable storage medium coupled with the processor that stores instructions that, when executed by the processor, cause said processor to perform the following:

receive, over a transport connection between a client device and a server, a first request message;

determine characteristics of the first request message, including one or more contents of the first request message, the one or more contents of the first request message including a first header and a first pathname;

determine a first congestion control algorithm based on the determined characteristics of the first request message, including pattern matching a first keyword of the first pathname with elements of a plurality of congestion control rules apply the first congestion control algorithm to the transport connection for application to a transmission of a first response message to the first request message;

receive, over the transport connection from the client device, a second request message;

determine characteristics of the second request message, including one or more contents of the second request message, the one or more contents of the second request message including a second header and a second pathname;

determine a second congestion control algorithm based on the determined characteristics of the second request message, including pattern matching a second keyword of the second pathname with the elements of the plurality of congestion control rules; and apply the second congestion control algorithm to the transport connection for application to a transmission of a second response message to the second request message, wherein the second congestion control algorithm is different from the first congestion control algorithm.

14. The apparatus of claim 13, wherein the instructions further cause said processor to perform the following:

prior to applying the second congestion control algorithm to the transport connection, determine that the transport connection is idle.

15. The apparatus of claim 13, wherein applying the second congestion control algorithm to the transport connection for application to the transmission of the second response message comprises:

determining an expected bandwidth for the transport connection based on a history of the transport connection; and initiating the second congestion control algorithm with a different value for a state variable based on the expected bandwidth and round-trip time for the transport connection.

16. The apparatus of claim 13, wherein determining the first congestion control algorithm based on the characteristics of the first request message comprises:

identifying that the first pathname in the first request message indicates the first request message is a request for first content having a first size greater than a threshold size; and selecting the first congestion control algorithm from a plurality of congestion control algorithms based on the first content having the first size greater than the threshold size.

17. The apparatus of claim 13, wherein determining the second congestion control algorithm based on the characteristics of the second request message comprises:

identifying that the second pathname in the second request message indicates the second request message is a request for second content having a second size less than a threshold size; and selecting the second congestion control algorithm from a plurality of congestion control algorithms based on the second content having the second size less than the threshold size.

18. The apparatus of claim 13, wherein determining the first congestion control algorithm based on the characteristics of the first request message comprises:

parsing the first header of the first request message to determine a first size of first content requested in the first request message; and selecting the first congestion control algorithm from a plurality of congestion control algorithms based on the first content having the first size greater than a threshold size.

* * * * *